United States Patent [19]

Akimune et al.

[11] Patent Number: 5,076,054

[45] Date of Patent: Dec. 31, 1991

[54] EXHAUST APPARATUS FOR COMBUSTION EQUIPMENT

[75] Inventors: Yoshio Akimune, Yokohama; Shuzo Miyanoo, Isesaki, both of Japan

[73] Assignees: Nissan Motor Co., Ltd., Yokohama; Japan Electronic Control Systems Co., Isesaki, both of Japan

[21] Appl. No.: 562,553

[22] Filed: Aug. 3, 1990

[30] Foreign Application Priority Data

Aug. 24, 1989 [JP] Japan .................................. 1-217983

[51] Int. Cl.[5] .......................... B28B 21/92; F16L 9/10

[52] U.S. Cl. ....................................... 60/272; 138/149; 428/34.5; 428/34.4; 428/938; 427/249; 427/255.2

[58] Field of Search ................ 60/272; 428/34.5, 34.4, 428/938; 427/249, 237, 255.2, 255; 138/123, DIG. 2, 149

[56] References Cited

U.S. PATENT DOCUMENTS

| | | | |
|---|---|---|---|
| 4,254,621 | 3/1981 | Nagumo | 60/282 |
| 4,341,826 | 7/1982 | Prewo et al. | 428/38 |
| 4,526,824 | 7/1985 | Dworak et al. | 428/35 |
| 4,648,243 | 3/1987 | Korkemeier | 60/272 |
| 4,889,481 | 12/1989 | Morris et al. | 431/328 |
| 4,923,716 | 5/1990 | Brown et al. | 427/249 |
| 4,980,202 | 12/1990 | Brennan et al. | 427/249 |
| 4,998,517 | 3/1991 | Kawamura | 123/270 |

FOREIGN PATENT DOCUMENTS

| | | |
|---|---|---|
| 58-99180 | 6/1983 | Japan . |
| 60-180659 | 9/1985 | Japan . |
| 60-149853 | 10/1985 | Japan . |
| 62-40232 | 3/1987 | Japan . |

*Primary Examiner*—Ira S. Lazarus
*Assistant Examiner*—Leonard E. Heyman
*Attorney, Agent, or Firm*—Foley & Lardner

[57] ABSTRACT

An exhaust apparatus for a combustion equipment comprises an exhaust liner which includes a tubular member. The tubular member is formed by weaving or braiding a SiC fiber. A SiC is infiltrated thereinto out of the inner wall portion of the tubular member by the CVD method, thus obtaining an exhaust liner including a SiC Fiber/CVD - SiC composite. The density of SiC is greater in the inner wall of the exhaust liner than in the outer wall thereof.

11 Claims, 5 Drawing Sheets

EXHAUST APPARATUS FOR COMBUSTION EQUIPMENT

BACKGROUND OF THE INVENTION

The present invention relates to an exhaust apparatus for a combustion equipment, such as an internal combustion engine.

In previously proposed internal combustion engines, an exhaust apparatus includes an exhaust passage arranged within a water cooled cylinder head. With such exhaust apparatus, it is desirable to ameliorate an adiabatic performance thereof so as to minimize a decrease in temperature of exhaust gas. This results in, for example, an increase in initial conversion efficiency of a catalyzer for exhaust gas purification, an improvement in initial response characteristic of an oxygen sensor element, an increase in operating efficiency of a turbo charger, and the like. Thus, various kinds of exhaust apparatus including an exhaust liner have been proposed for this purpose.

Such exhaust apparatuses with improved adiabatic performance are classified into the following categories:

1. Exhaust apparatus which includes a layer of inorganic fiber as an exhaust liner which in turn includes a layer of ceramic thereinside (see JP-A 59-175693, JP-A 60-180659, and JP-U 60-149853),
2. Exhaust apparatus which includes a tubular member of ceramic as an exhaust liner, and has at least in part of the tubular member a reinforcement of zirconia and the like so as to surely hold the tubular member (see JP-A 60-169655),
3. Exhaust apparatus which includes a layer of flame sprayed ceramic as an exhaust liner (see JP-A 58-99180, and JP-U 62-40232).

A problem encountered in the aforementioned exhaust apparatuses in categories 1 and 2 is that the ceramic may be fractured by a thermal stress and/or a mechanical stress, and a temperature of exhaust gas may be reduced due to relatively large amount of heat conduction in a direction perpendicular to an exhaust gas flow.

Another problem encountered in the above-mentioned exhaust apparatus in category 3 is that the layer of flame sprayed ceramic may break away from the inner wall by a thermal stress and/or a mechanical stress.

SUMMARY OF THE INVENTION

It is, therefore, an object of the present invention to provide an exhaust apparatus for a combustion equipment which assumes an improved tenacity of exhaust apparatus members.

It is another object of the present invention to provide an exhaust apparatus for a combustion equipment which is excellent in adiabatic performance, and greater in heat conductivity in a direction parallel to an exhaust gas flow than in a direction perpendicular thereto, and which minimizes a decrease in temperature of exhaust gas.

According to one aspect of the present invention, there is provided an exhaust apparatus for exhaust gas from a combustion equipment, comprising:

a tubular member made from a SiC fiber, said tubular member having a passage for the exhaust gas, said tubular member including inner wall means defining said passage and an outer wall, said tubular member being exposed to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has; and a body surrounding said tubular member and firmly engaging with said outer wall thereof.

According to another aspect of the present invention, there is provided a liner for a high temperature gas, comprising:

a tubular member made from a SiC fiber, said tubular member having a passage for the high temperature gas, said tubular member including inner wall means defining said passage and an outer wall, said tubular member being exposed to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has.

According to still another aspect of the present invention, there is provided a method of constructing a liner for a high temperature gas, comprising the steps of:

making a tubular member from a SiC fiber, said tubular member having a passage for the high temperature gas, said tubular member including inner wall means defining said passage and an outer wall; and exposing said tubular member to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has.

According to further aspect of the present invention, there is provided a method of constructing a passage structure for a high temperature gas, comprising the steps of:

weaving a tubular member with a SiC fiber, said tubular member having a passage for the high temperature gas, said tubular member including inner wall means defining said passage and an outer wall; and exposing said tubular member to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has.

DETAILED DESCRIPTION OF THE INVENTION

Referring to the accompanying drawings, preferred embodiments of an exhaust apparatus for a combustion equipment according to the present invention will be described.

Figure 1:
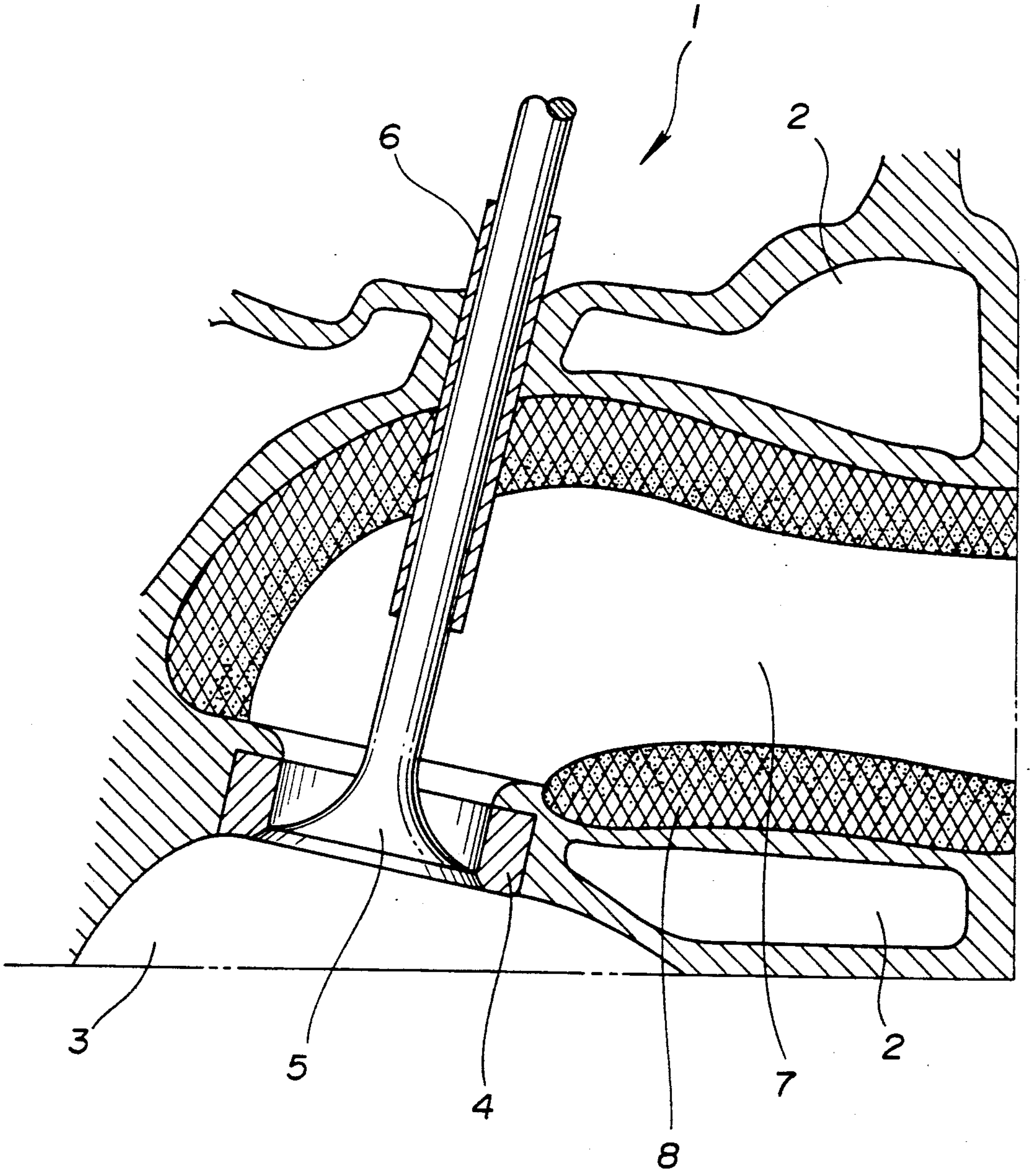
FIG. 1 is a partially sectional view illustrating a first preferred embodiment of an exhaust apparatus according to the present invention.

Referring to FIG. 1, there is shown a first preferred embodiment of the present invention in which a combustion equipment is an internal combustion engine.

Figure 2A:
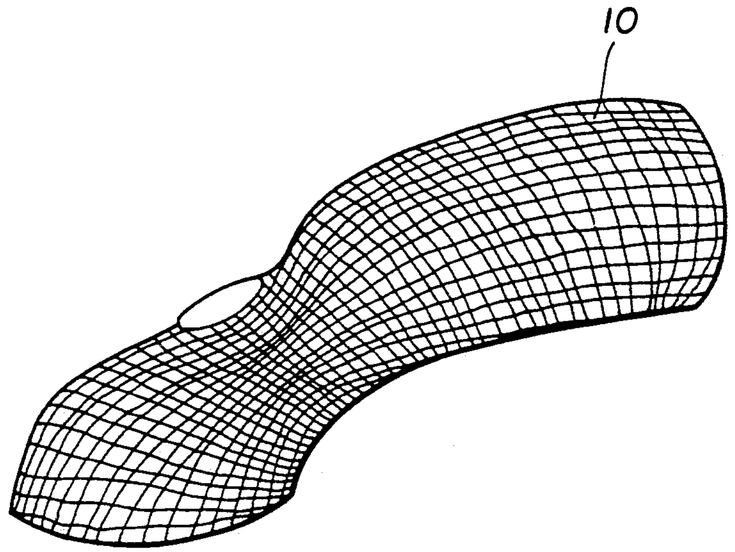
FIG. 2*a* is a perspective view illustrating a fiber tubular member of an exhaust liner shown in FIG. 1.
Figure 2B:
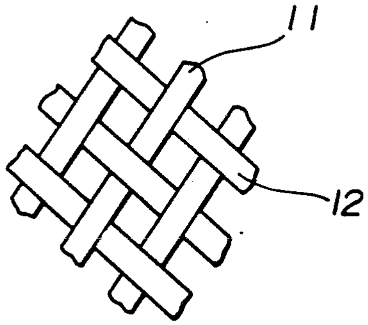
FIG. 2*b* is an enlarged fragmentary top plan view illustrating a woven fiber tubular member.
Figure 2C:
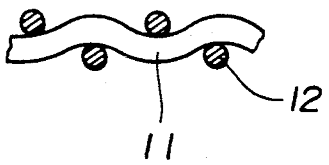
FIG. 2*c* is an enlarged fragmentary sectional view illustrating the woven fiber tubular member shown in FIG. 2*b;*
Figure 2D:
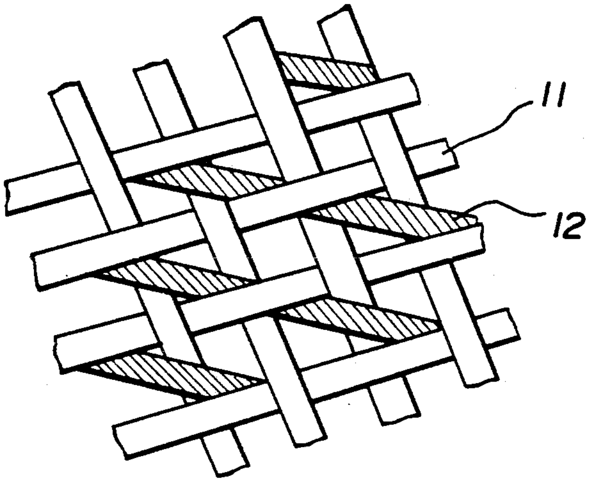
FIG. 2*d* is a view similar to FIG. 2*b*, but illustrating a braided fiber tubular member.
Figure 2E:
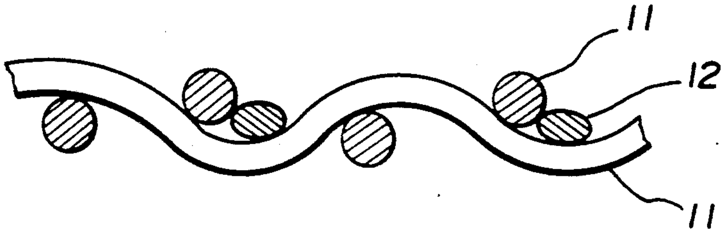
FIG. 2e is a view similar to FIG. 2c, but illustrating the braided fiber tubular member shown in FIG. 2d.

Referring to FIG. 1, the internal combustion engine comprises a cylinder head 1. The cylinder head 1 includes a coolant passage 2 which is arranged therewithin, a combustion chamber 3, a valve seat 4, an exhaust valve 5, a valve stem guide 6, an exhaust passage 7, and an exhaust liner 8 which is arranged on an inner wall thereof. The exhaust liner 8 is made of a tubular member which is formed by weaving or braiding a silicone carbide (SiC) fiber in a two-dimensional or three-dimensional architecture. A SiC is infiltrated into the tubular body out of the inner wall portion thereof by a Chemical Vapor Deposition (CVD) method, so that the exhaust liner 8 includes a SiC fiber/CVD - SiC composite in the inner wall thereof. Referring to FIG. 2a, before making the exhaust liner 8, a tubular member 10 is formed by weaving or braiding the SiC fiber in a two-dimensional or three-dimensional architecture. A SiC fiber which is produced by NIHON CARBON, Co., Ltd. and trade named NICALON is used in this embodiment.

Referring to FIGS. 2b-2e, the tubular body 10 is constructed by weaving or braiding SiC fibers 11 and 12, and has the shape corresponding to the same of the exhaust passage 7 as shown in FIG. 1.

Next, the SiC is infiltrated into the tubular member 10 outwardly into the inner wall and out of the outer wall portion thereof by the CVD method.

Figure 3A:
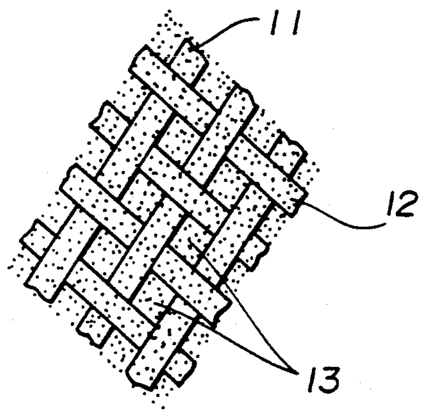
FIG. 3a is a view similar to FIG. 2d, but illustrating the exhaust liner shown in FIG. 1.
Figure 3B:
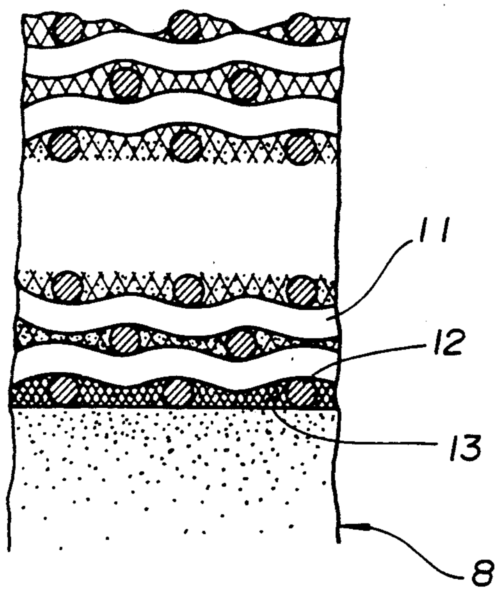
FIG. 3b is a view similar to FIG. 2e, but illustrating the exhaust liner shown in FIG. 1.

This CVD method uses a $SiCl_4$—$C_3H_8$ gas, a $CH_3SiCl_3$—$H_2$ gas, and the like. Referring to FIG. 2a, the tubular member 10 is disposed in a flow of the aforementioned gas which passes from the inner wall portion of the tubular body 10 to the outer wall portion thereof. Referring to FIGS. 3a and 3b, the SiC is deposited first to the SiC fibers 11 and 12 on the inner surface thereof which is nearer to the aforementioned gas flow. Then, the deposition of the SiC develops gradually from the inner wall portion of the tubular member 10 to the outer wall portion thereof. When the SiC densely fills in a clearance which is defined between the SiC fibers 11 and 12, and located on the inner wall portion of the tubular body 10, the deposition of the SiC is terminated. As a result, the exhaust liner 8 is obtained, which includes the SiC fiber/CVD -SiC composite in the inner wall thereof. In the inner wall of the exhaust liner 8 which is located upstream of the aforementioned gas flow, a percentage of the actual SiC density to the theoretical one is more than 99%. On the other hand, in the inner wall of the exhaust liner 8 which is located downstream of the aforementioned gas flow, a percentage of the actual SiC density to the theoretical one is equal to 70–80%.

Then, the obtained exhaust liner 8 is set in a molding box for a cylinder block of the internal combustion engine. A molten aluminum alloy is casted in the molding box, thus obtaining the cylinder head 1 of aluminum alloy with which the exhaust liner 8 is incorporated as shown in FIG. 1.

In the outer wall of the exhaust liner 8, a percentage of the actual SiC density to the theoretical one is equal to 70–80%, and is formed with a porous portion. The molten aluminum alloy enters in the porous portion, then solidifies therein, contributing to the excellent mechanical connection of the exhaust liner 8 to the cylinder head 1. At the same time, subjected to a compression stress due to solidification and contraction of the molten aluminum alloy, the exhaust liner 8 is fixedly mounted within the cylinder head 1, without inducing breakaway even when the cylinder head 1 undergoes the vibrations during engine operation.

Further, the exhaust liner 8 is formed with a void of about 20–30% in volume in the outer wall thereof. Thus, even if the exhaust liner 8 is subjected to a great compression stress with solification and contraction of the molten aluminum alloy, this compression stress is absorbed by the outer wall of the liner 8 which is contractible and transformable due to presence of the void.

The following table shows test results of heat conductivity of the first embodiment of an exhaust apparatus, which are measured in a direction parallel to an exhaust gas flow, and in a direction perpendicular thereto, respectively.

| Designation | Heat conductivity (cal/cm · sec · °C.) |
|---|---|
| Parallel | 0.15 |
| Perpendicular | 0.12 |

As seen in the above table, this exhaust apparatus is greater in heat conductivity in the direction parallel to the exhaust gas flow than in the direction perpendicular thereto. For a temperature measured at an outlet of the exhaust passage 7, there is a difference of about 150 C between this exhaust apparatus and the same without the exhaust liner 8.

Further, in the vicinity of the exhaust liner 8, no inconvenience such as a breakage due to thermal stress and vibrations is confirmed by an endurance test for 200 hours on a full load test stand.

Figure 4:
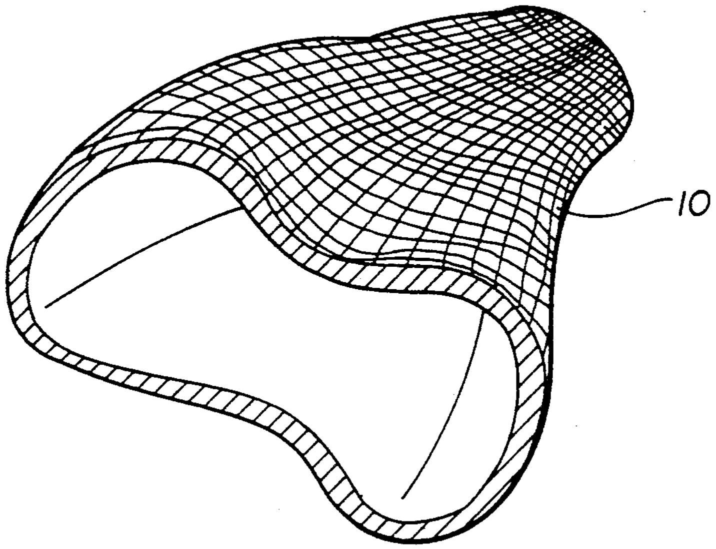
FIG. 4 is a view similar to FIG. 2a, but illustrating a fiber tubular member used by a second preferred embodiment of an exhaust apparatus according to the present invention.

Referring to FIG. 4, there is shown a second preferred embodiment of the present invention.

A tubular member 10 is formed by weaving the SiC fiber in a two-dimensional or three-dimensional architecture, and has the shape corresponding to an internal shape of an exhaust manifold as shown in FIG. 4. Then, the SiC is infiltrated into the tubular member 10 out of the inner wall portion thereof by the CVD method, thus obtaining an exhaust liner for an exhaust manifold which includes the SiC fiber/CVD - SiC composite in the inner wall thereof. In the inner wall of the exhaust liner, a percentage of the actual SiC density to the theoretical one is more than 99%. On the other hand, in the outer wall of the exhaust liner, a percentage of the actual SiC density to the theoretical one is equal to 70–80%.

Next, the exhaust liner is shrink fitted in the inside of the exhaust manifold of cast iron, thus obtaining an exhaust manifold apparatus.

In a manner similar to the exhaust apparatus as described above, this exhaust manifold apparatus is greater in heat conductivity in the direction parallel to the exhaust gas flow than in the direction perpendicular thereto. That is, the use of the exhaust liner contributes to much increase in exhaust gas temperature.

Figure 5:
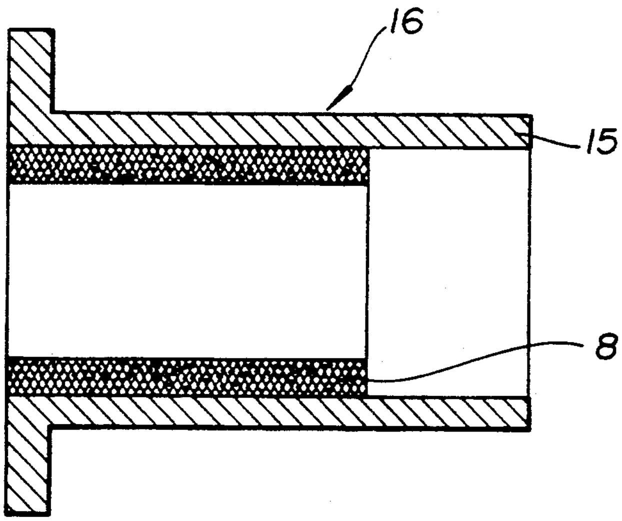
FIG. 5 is a sectional view illustrating a third preferred embodiment of an exhaust apparatus according to the present invention.

Referring to FIG. 5, there is shown a third preferred embodiment of the present invention.

A tubular member is formed by weaving or braiding the SiC fiber in a two-dimensional or three-dimensional architecture, and has the shape corresponding to an internal shape of an exhaust pipe. Then, the SiC is infiltrated into the tubular member out of the inner wall portion thereof by the CVD method, thus obtaining an exhaust liner 8 for an exhaust pipe which includes the SiC fiber/CVD - SiC composite in the inner wall thereof. In the inner wall of the exhaust liner 8, a percentage of the actual SiC density of the SiC to the theoretical one is more than 99%. On the other hand, in the outer wall of the exhaust liner 8, a percentage of the actual SiC density to the theoretical one is equal to 70–80%.

Next, the exhaust liner is shrink fitted in the inside of a steel pipe 15, thus obtaining the exhaust pipe apparatus 16.

In a manner similar to the exhaust manifold apparatus as described above, this exhaust pipe apparatus 16 is greater in heat conductivity in the direction parallel to the exhaust gas flow than in the direction perpendicular thereto. That is, the use of the exhaust liner contributes to much increase in exhaust gas temperature.

What is claimed is:

1. An exhaust apparatus for exhaust gas from a combustion equipment, comprising:

- a tubular member made from a SiC fiber, said tubular member having a passage for the exhaust gas, said tubular member including inner wall means defining said passage and an outer wall, said tubular, member being exposed to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has; and
- a body surrounding said tubular member and firmly engaging with said outer wall thereof.

2. An exhaust apparatus as claimed in claim 1, wherein said body is a cylinder head of aluminum alloy.

3. An exhaust apparatus as claimed in claim 1, wherein said body is an exhaust manifold.

4. An exhaust apparatus as claimed in claim 1, wherein said body is made by molding.

5. An exhaust apparatus as claimed in claim 1, wherein said body is a steel pipe.

6. An exhaust apparatus as claimed in claim 1, wherein said tubular member results from weaving said SiC fiber.

7. An exhaust apparatus as claimed in claim 1, wherein said tubular member results from braiding said SiC fiber.

8. An exhaust apparatus as claimed in claim 1, wherein a percentage of the actual SiC density to the theoretical SiC density is greater than 99% within said inner wall means of said tubular member, while falls in a range from 70 to 80% in said outer wall thereof.

9. A liner for a high temperature gas, comprising:

- a tubular member made from a SiC fiber, said tubular member having a passage for the high temperature gas, said tubular member including inner wall means defining said passage and an outer wall, said tubular member being exposed to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has.

10. A method of constructing a liner for a high temperature gas, comprising the steps of:

- making a tubular member from a SiC fiber, said tubular member having a passage for the high temperature gas, said tubular member including inner wall means defining said passage and an outer wall; and
- exposing said tubular member to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has.

11. A method of constructing a passage structure for a high temperature gas, comprising the steps of:

- weaving a tubular member with a SiC fiber, said tubular member having a passage for the high temperature gas, said tubular member including inner wall means defining said passage and an outer wall; and
- exposing said tubular member to a predetermined gas containing Si and C flowing in radial directions from said inner wall means of said tubular member and out of said outer wall in a process of Chemical Vapor Deposition (CVD) to make a SiC fiber/CVD - SiC composite, whereby SiC deposited within said inner walls means has a greater density than SiC deposited within said outer wall has.

* * * * *